United States Patent [19]
Richter et al.

[11] Patent Number: 5,209,706
[45] Date of Patent: May 11, 1993

[54] RUBBER BELT CRAWLER CHAIN

[75] Inventors: Utz Richter, Markgröningen; Jürgen Hawener, Möglingen; Volker Kramer, Erdmannhausen; Friedrich Depfenhart, Heimsheim, all of Fed. Rep. of Germany

[73] Assignee: Dr. Ing. H.C.F. Porsche AG, Fed. Rep. of Germany

[21] Appl. No.: 913,687

[22] Filed: Jul. 15, 1992

[30] Foreign Application Priority Data
  Jul. 15, 1991 [DE] Fed. Rep. of Germany ....... 4123332

[51] Int. Cl.$^5$ ............................... F16G 3/02
[52] U.S. Cl. ................. 474/253; 474/255; 474/257
[58] Field of Search ................. 474/253-258

[56] References Cited

U.S. PATENT DOCUMENTS

| 516,568 | 3/1894 | Garland | 474/255 X |
| 566,455 | 8/1896 | Hyatt | 474/255 X |
| 608,886 | 8/1898 | Marvel | 474/255 |
| 4,023,239 | 5/1977 | Stolz | 474/257 X |

FOREIGN PATENT DOCUMENTS

| 3824774 | 2/1990 | Fed. Rep. of Germany . |
| 4014790 | 5/1990 | Fed. Rep. of Germany . |

Primary Examiner—Thuy M. Bui
Attorney, Agent, or Firm—Evenson, McKeown, Edwards & Lenahan

[57] ABSTRACT

A rubber belt crawler chain for a vehicle is equipped with chain guiding members which are slidingly guided in one another, are each connected with a cross-piece, and accommodate between one another steel cables of a rubber bearing body surrounding the cross-piece. The cross-piece has two clamping elements forming a receiving device for the steel cables between one another, in which groove-shaped guides for the cables are arranged in one clamping element, and are covered in a web-shaped manner by the other clamping element.

14 Claims, 2 Drawing Sheets

# RUBBER BELT CRAWLER CHAIN

BACKGROUND AND SUMMARY OF THE INVENTION

This invention relates to a rubber belt crawler chain having chain guiding members which are slidingly guided inside one another and are connected with a cross-piece adapted to accommodate steel cables.

A rubber belt crawler chain is known from the German Patent Document DE-A 38 24 774, wherein cross-pieces having cables therein are arranged in rubber sleeves for a precise alignment so that a contact with clamping plates of the cross-piece, and thus destruction caused by metallic friction, becomes impossible. A crawler chain of this type requires relatively high manufacturing expenditures due to the amount of labor required for pushing the rubber sleeves onto the wire cables as well as the precise arrangement of the cables between longitudinal webs of the two clamping plates having corresponding recesses for this purpose.

It is an object of the invention to provide an improved rubber belt crawler chain for a vehicle having cables with a high running capacity which can be manufactured with reduced labor expenditures.

According to the invention, this and other objects are achieved by a rubber belt crawler for a vehicle having chain guide members which are slidingly guided inside one another and are connected with a cross-piece adapted to accommodate steel cables of a rubber bearing body surrounding the cross-piece between one another, the cross-piece having two clamping elements which form a receiving device for the steel cables between one another, groove-shaped guides for the cables being arranged in one clamping element and covered in a web-shaped manner by the other clamping element.

An advantage achieved by the invention is that the position of the cables in the cross-piece is fixed without having to use rubber sleeves. This takes place in guides of a clamping element of the cross-piece which are opposed by recesses in another clamping element of the cross-piece, in which case the cables are arranged in the connection plane of the two clamping elements.

In the prior art, because of local overstressing during the operation of the crawler chain, the clamping elements shift relative to one another so that, as in the case of the crawler chain according to the German Patent Document DE-A 38 24 774, the opposing groove-shaped guides in the two clamping elements also change their position with respect to one another and there is the risk of a squeezing or shearing-off of the cables in the connection plane of the clamping elements. According to the invention, this disadvantage is avoided by the fact that groove-shaped guides are provided in only one element, and in the other opposite clamping element a duct is provided which has a continuous surface. In the case of a shifting of the clamping elements relative to one another during the operation, a squeezing or shearing-off of the cable is therefore no longer possible because the cables can slide along on the continuous surface of the duct.

In an embodiment of the invention, the groove-shaped guides are arranged in a transverse web of the cross-piece, and separating ribs extend to the continuous surface of the opposite clamping piece. As a result, the section modulus against bending is advantageously fully maintained because the ribs between the guides prevent a collapsing of the clamping elements during bending.

In order to avoid damage to the cables caused by the ribs and guides, the ribs and guides are provided with roundings in an embodiment of the invention so that during the manufacturing of the chain and in the driving operation, the cables cannot be damaged.

In order to also prevent squeezing of the extreme cable position during the operation, an embodiment of the invention provides the duct with a clearance in one clamping element with respect to the respective cables disposed on the outside.

In an embodiment of the crawler chain, the transverse web is arranged in a perpendicular transverse center plane of the cross-piece and has a construction that is as narrow as possible. As a result, it is possible to provide a maximum amount of rubber between the cable and the clamping elements and to thus achieve optimal elasticity. This maximum amount of rubber is achieved by a space that is as large as possible between the clamping elements having a relatively large height. In the end area, the clamping elements have opening slopes which are disposed at an angle. As a result, it is prevented that the cables, in the case of a maximal cable deflection, during the operation, come to rest on the exterior edges of the clamping pieces.

Another embodiment of the crawler chain arranges the groove-shaped guides in the clamping element facing away from the road, and the clamping element with the flat duct faces the road.

Other objects, advantages and novel features of the present invention will become apparent from the following detailed description of the invention when considered in conjunction with the accompanying drawings.

DETAILED DESCRIPTION OF DRAWINGS

Figure 1:
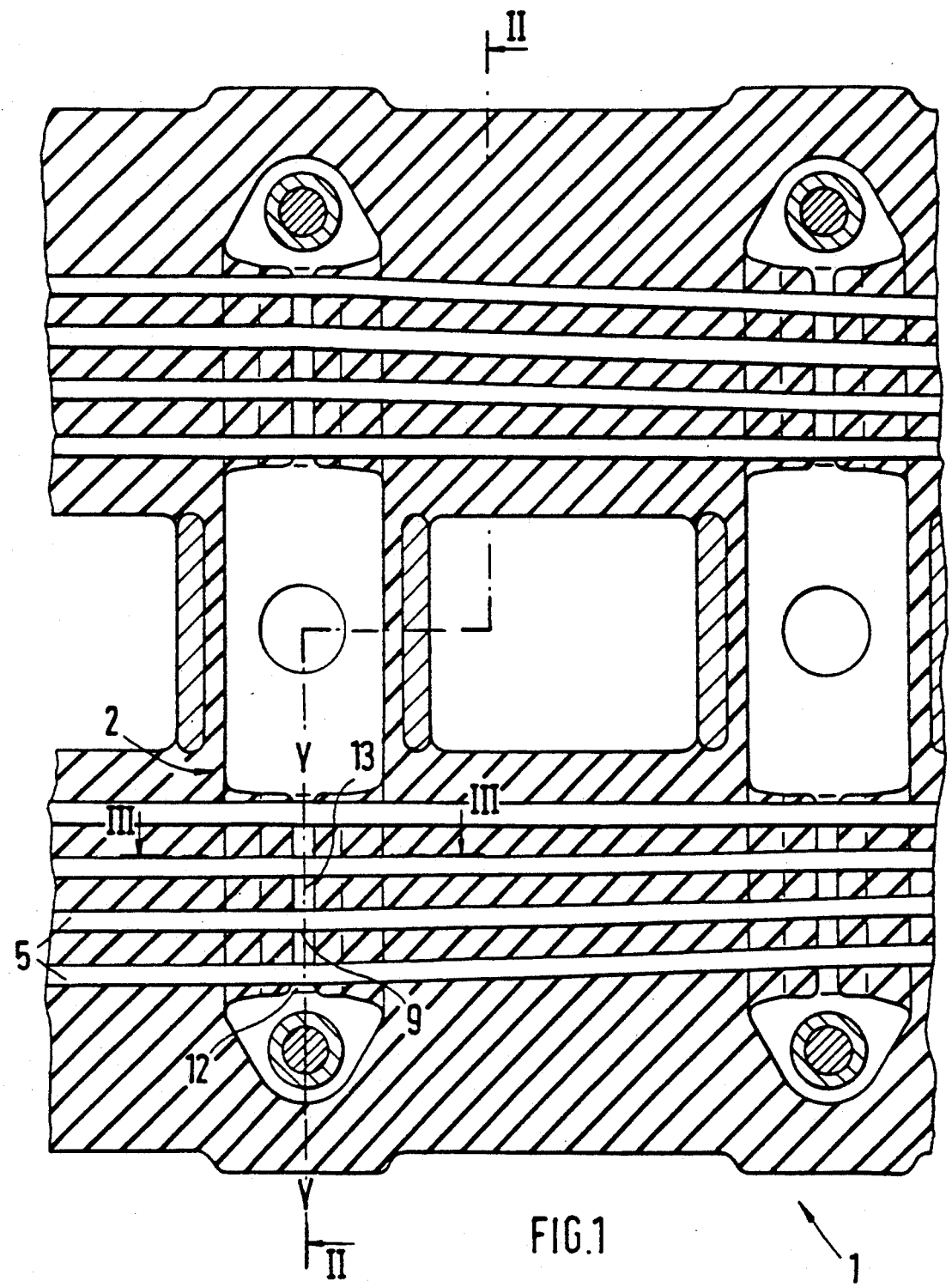
FIG. 1 is a horizontal sectional view of a crawler chain construed in accordance with an embodiment of the present invention.
Figure 2:
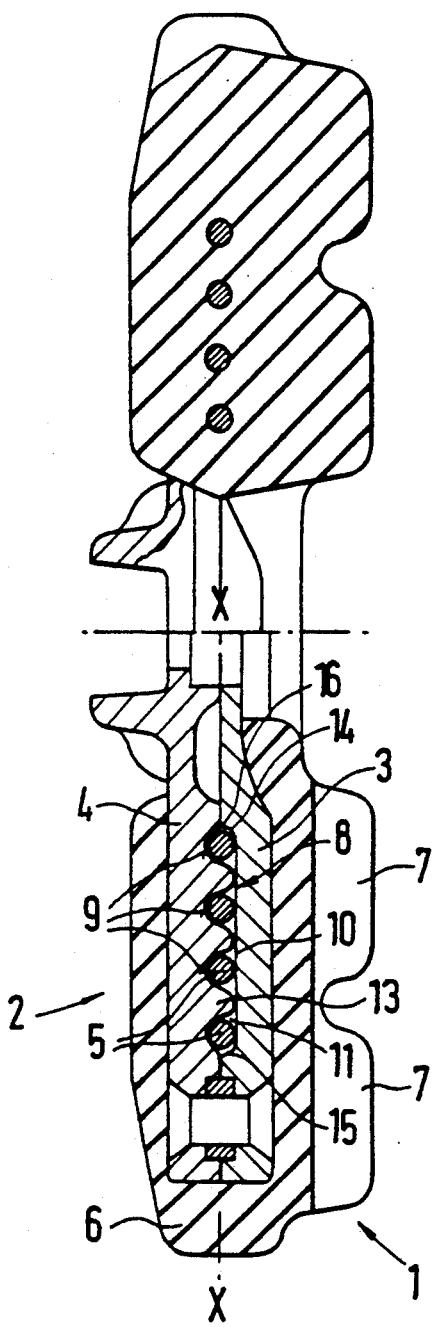
FIG. 2 is a sectional view according to Line II-II of FIG. 1.

A crawler chain 1 comprises cross-pieces 2 which comprise two mutually connected clamping elements 3 and 4 respectively which, along a specific area, accommodate several cables 5 between one another. The clamping elements 3 and 4 and the cables are surrounded by a rubber body 6 which has running lugs 7 directed toward a road.

The cables 5 are arranged in parallel next to one another in a receiving device 8 between the two clamping elements 3, 4. The first clamping element 4 is formed by groove-shaped guides 9 and the second clamping element 3 is formed by a duct provided with a continuous web 10.

The groove-shaped guides 9 are arranged in a transverse web 12 of the cross-piece 2 at a transverse distance from one another. The ribs 13 formed between the guides 9 extend directly to the web 10 of the duct 11 in the clamping element 3.

The guides 9 and the ribs 13 have such a depth or height that the connection plane X—X of the two clamping elements 3 and 4 passes through longitudinal axes of the cables 5.

The transverse web 12 with the guides 9 is preferably disposed in a perpendicular transverse center plane Y—Y of the cross-piece 2.

The guides 9 and the intermediate ribs 13 have an approximately triangular cross-section and are rounded so that the cable 5 is held without the risk of damage and cannot chafe on any edge during manufacture of the crawler chain as well as during operation.

A transverse play 16 is provided in order to prevent metallic contact that would occur between the outer cables in the clamping elements 3 and 4, and the lateral boundaries 14, 15 of the duct 11, during bending of the cross-piece 2.

The groove-shaped guides 9 are preferably arranged in the clamping element 4 to face away from the road, the clamping element 3 having the web 10 being directed toward the road.

Figure 3:
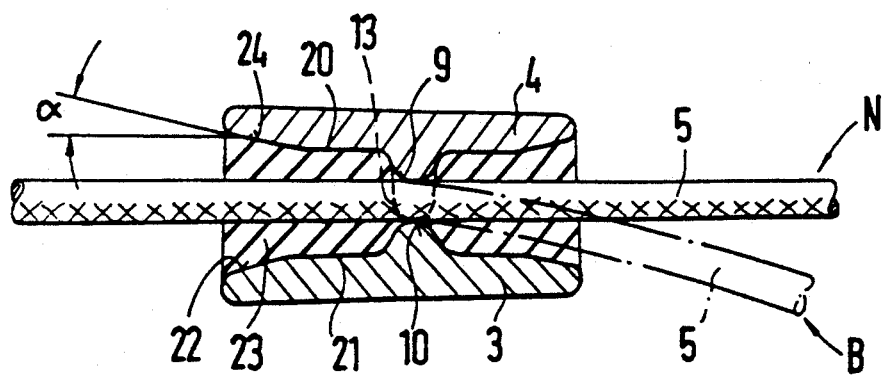
FIG. 3 is a sectional view according to Line III-III of FIG. 1.

Between the interior surfaces 20 and 21 of the clamping elements 4 and 3, spaces provided on both sides of the receiving device 8 for the cables 5, are filled with an elastic material 23. In the maximal operating position B, in which the cable 5 is deflected from the normal position N (FIG. 3), the cable 5 will not be damaged by a resting or rubbing against the clamping element 3 or 4. The free ends are provided with an opening slope 22, 24 forming a conical widening so that the cable can deflect about an angle a without any impairment.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A rubber belt crawler chain for a vehicle, comprising:
   chain guiding members which are slidingly guided inside one another and are connected with a cross-piece adapted to accommodate steel cables of a rubber bearing body surrounding the cross-piece between one another, wherein the cross-piece has two clamping elements which form a receiving device for the steel cables between one another, and wherein groove-shaped guides for the cables are arranged in one of said clamping elements and are covered in a web-shaped manner by the other of said clamping elements.

2. A crawler chain according to claim 1, wherein the groove-shaped guides are arranged in a transverse web of the cross-piece at a lateral distance from one another, having ribs extending between the guides to a continuous web of a duct of the other clamping element.

3. A crawler chain according to claim 1 wherein the guides and the web have such a position in the clamping elements that the longitudinal axes of the cables are situated in the connection plane of the two clamping elements.

4. A crawler chain according to claim 1, wherein the transverse web is arranged in a perpendicular transverse center plane of the cross-piece.

5. A crawler chain according to claim 1, wherein the ribs and the guides have triangular cross-sections and the base of the guides as well as the free ends of the ribs are rounded on all sides.

6. A crawler chain according to claim 1 wherein a web is arranged in a clamping element with a play in the transverse direction with respect to the respective outer or inner cable.

7. A crawler chain according to claim 1, wherein a clamping element facing the road comprises the continuous web which is situated opposite the groove-shaped guides in the other of the clamping elements.

8. A crawler chain according to claim 1, wherein a space which is filled with an elastic material is provided between the interior surfaces of the clamping elements, on both sides of the receiving device for the cable.

9. A crawler chain according to claim 1, wherein the interior surface, on the end face, has an opening slope with an angle for the maximal cable deflection from a normal position to a maximal operating position.

10. A crawler chain according to claim 2, wherein the guides and the web have such a position in the clamping pieces that the longitudinal axes of the cables are situated in the connection plane of the two clamping elements.

11. A crawler chain according to claim 10, wherein the guides and the web have such a position in the clamping elements that the longitudinal axes of the cables are situated in the connection plane of the two clamping elements.

12. A crawler chain according to claim 11 wherein a web is arranged in a clamping element with a play in the transverse direction with respect to the respective outer or inner cable.

13. A crawler chain according to claim 12, wherein a clamping element facing the road comprises the continuous web which is situated opposite the groove-shaped guides in the other of the clamping elements.

14. A crawler chain according to claim 8, wherein the interior surface, on the end face, has an opening slope with an angle for the maximal cable deflection from a normal position to a maximal operating position.

* * * * *